US008466950B2

(12) United States Patent
Kim et al.

(10) Patent No.: US 8,466,950 B2
(45) Date of Patent: Jun. 18, 2013

(54) METHOD AND APPARATUS FOR VIDEO CALL IN A MOBILE TERMINAL

(75) Inventors: Jong-Jin Kim, Suwon-si (KR); Min Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 266 days.

(21) Appl. No.: 12/948,972

(22) Filed: Nov. 18, 2010

(65) Prior Publication Data
US 2011/0122219 A1    May 26, 2011

(30) Foreign Application Priority Data
Nov. 23, 2009  (KR) ................. 10-2009-0113081

(51) Int. Cl.
*H04N 7/141*    (2006.01)

(52) U.S. Cl.
USPC ................. 348/14.02; 348/14.01; 348/14.12

(58) Field of Classification Search
USPC .................. 348/14.01–14.16; 345/474, 473, 345/419, 619; 455/556.1, 466
See application file for complete search history.

(56) References Cited

U.S. PATENT DOCUMENTS

| | | | |
|---|---|---|---|
| 2005/0190188 A1* | 9/2005 | Anzawa et al. | 345/474 |
| 2007/0139512 A1* | 6/2007 | Hada et al. | 348/14.01 |
| 2008/0062249 A1* | 3/2008 | Nagase et al. | 348/14.01 |
| 2010/0177116 A1* | 7/2010 | Dahllof et al. | 345/619 |

* cited by examiner

*Primary Examiner* — Melur Ramakrishnaiah
(74) *Attorney, Agent, or Firm* — Jefferson IP Law, LLP

(57) ABSTRACT

A method and an apparatus for a video call in a mobile communication terminal are provided. The method includes, upon performing a video call, setting an alternative video transmission mode according to a user's manipulation, generating an avatar representing a user's expression, and transmitting an alternative video including the avatar to a called mobile communication terminal.

7 Claims, 2 Drawing Sheets

METHOD AND APPARATUS FOR VIDEO CALL IN A MOBILE TERMINAL

PRIORITY

This application claims the benefit under 35 U.S.C. §119(a) of a Korean Patent Application filed in the Korean Intellectual Property Office on Nov. 23, 2009, and assigned Serial No. 10-2009-0113081, the entire disclosure of which is hereby incorporated by reference.

BACKGROUND OF THE INVENTION

1. Field of the Invention

The present invention relates to a video call of a mobile terminal. More particularly, the present invention relates to a method and an apparatus for, upon performing a video call, generating a video in a mobile communication terminal to be transmitted to a called mobile communication terminal.

2. Description of the Related Art

As the development of a wireless communication technology makes the high speed and high capacity data transmission of a mobile communication terminal possible, the mobile communication terminal is providing a video call service as well as a voice call service.

The video call service refers to a call service of transmitting/receiving a voice signal and a video signal between a plurality of mobile communication terminals. Accordingly, if a video call begins, the mobile communication terminal drives a camera, receives a video including a user's face, and transmits the video to a called mobile communication terminal. This video call may be advantageous in that users may see each other's faces at a great distance while talking on the phone, but may be disadvantageous in that it violates users' own privacy. That is, the user may be put in a difficult situation in case that the video call is received when he/she does not wish to show his/her own face.

A conventional solution to this problem is the use of a system in which a mobile communication terminal transmits a previously appointed specific image in place of a video inputted from a camera, to a called mobile communication terminal. However, the scheme of transmitting the previously appointed image may hurt the feeling of a user of the called mobile communication terminal, and has a limitation in meeting a variety of user's desires.

Therefore, a need exists for a method and an apparatus for performing a video call using an alternative video representing a user's expression, instead of the user's face, in a mobile communication terminal.

SUMMARY OF THE INVENTION

An aspect of the present invention is to address at least the above-mentioned problems and/or disadvantages and to provide at least the advantages below. Accordingly, an aspect of the present invention is to provide a method and an apparatus for generating a video for a video call in a mobile communication terminal.

Another aspect of the present invention is to provide a method and an apparatus for performing a video call using an alternative video representing a user's expression in a mobile communication terminal.

A further aspect of the present invention is to provide a method and an apparatus for, upon performing a video call, recognizing a user's expression in a video inputted through a camera and generating an alternative video in a mobile communication terminal.

Yet another aspect of the present invention is to provide a method and an apparatus for, upon performing a video call, generating an alternative video representing an expression according to a user's selection in a mobile communication terminal.

Still another aspect of the present invention is to provide a method and an apparatus for, upon performing a video call, generating an animation representing a user's expression in a mobile communication terminal.

The above aspects are addressed by providing a method and an apparatus for a video call in a mobile communication terminal.

According to an exemplary embodiment of the present invention, a method for a video call in a mobile communication terminal is provided. The method includes, upon performing a video call, setting an alternative video transmission mode according to a user's manipulation, generating an avatar representing a user's expression, and transmitting an alternative video including the avatar to a called mobile communication terminal.

According to another exemplary embodiment of the present invention, an apparatus for a video call in a mobile communication terminal is provided. The apparatus includes a controller and a communication module. Upon performing a video call, the controller sets an alternative video transmission mode according to a user's manipulation and generates an alternative video including an avatar representing a user's expression. The communication module transmits the alternative video to a called mobile communication terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
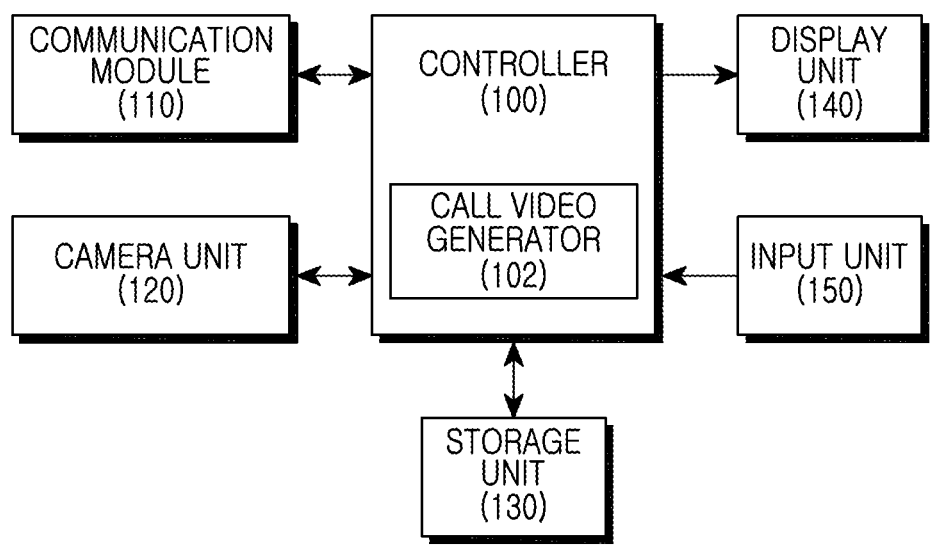
FIG. 1 is a block diagram illustrating a construction of a mobile communication terminal according to an exemplary embodiment of the present invention.
Figure 2:
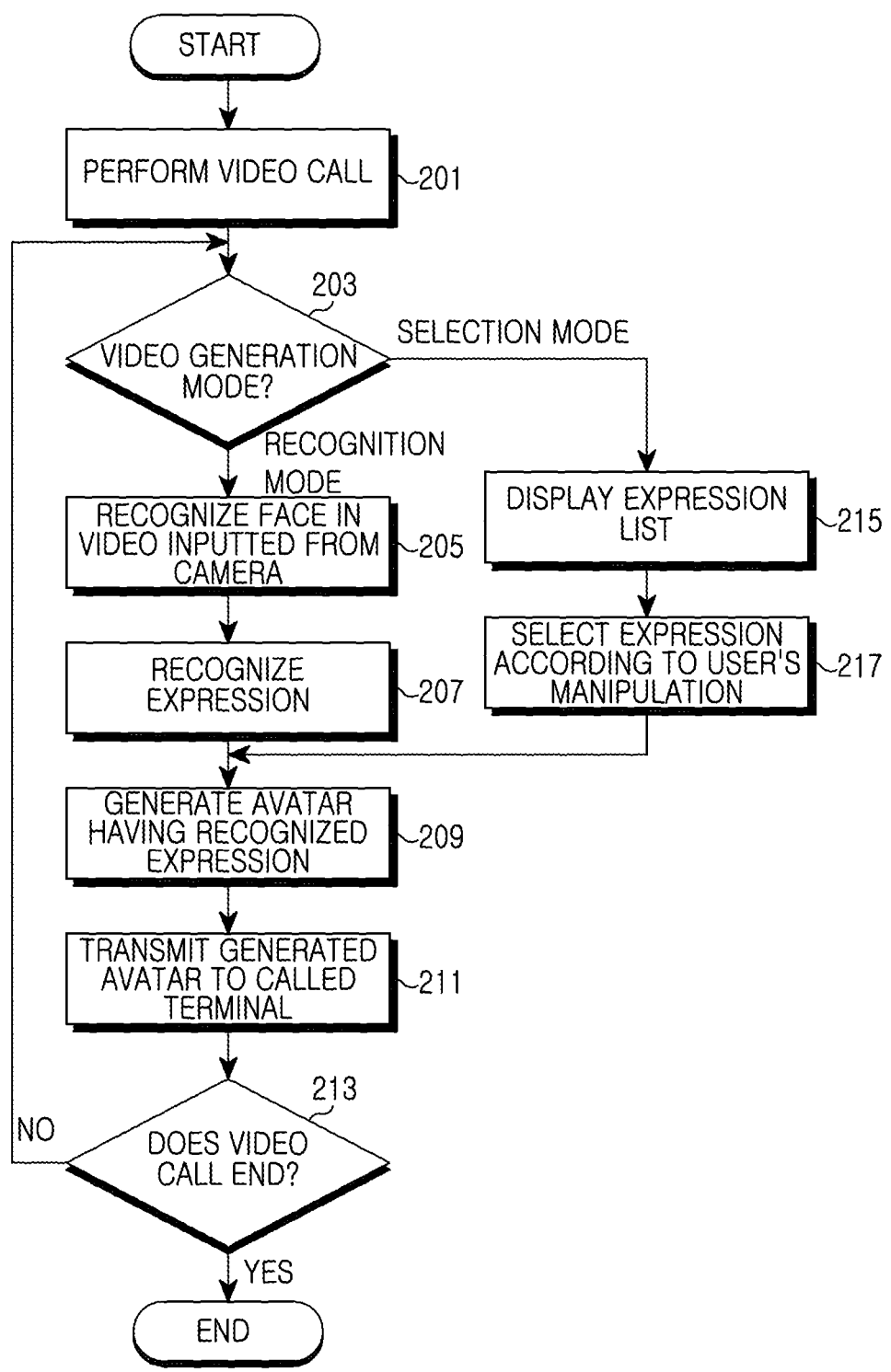
FIG. 2 is a flowchart illustrating a procedure of upon performing a video call, generating and transmitting an alternative video in a mobile communication terminal according to an exemplary embodiment of the present invention.

FIGS. 1 and 2, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

The following description is made for a method and an apparatus for, upon performing a video call, recognizing a user's expression in a video inputted through a camera and generating an alternative video in a mobile communication terminal according to an exemplary embodiment of the present invention.

FIG. 1 is a block diagram illustrating a construction of a mobile communication terminal according to an exemplary embodiment of the present invention.

Referring to FIG. 1, the mobile communication terminal includes a controller 100, a communication module 110, a camera unit 120, a storage unit 130, a display unit 140, and an input unit 150. The controller 100 includes a call video generator 102.

The controller 100 controls a general operation of the mobile communication terminal. For example, the controller 100 processes and controls voice call and data communication. More particularly, by including the call video generator 102, the controller 100 controls a function for, during a video call with a called mobile communication terminal, generating an alternative video representing a user's expression and transmitting the alternative video to the called mobile communication terminal.

If an alternative video transmission event occurs, the call video generator 102 controls a function for, upon performing a video call, recognizing a user's expression in a video inputted from the camera unit 120, and generating an alternative video including an avatar corresponding to the recognized expression. In addition, the call video generator 102 controls a function for displaying a list of expressions on the display unit 140, selecting at least one expression in the expression list through the input unit 150, and generating an alternative video including an avatar corresponding to the selected at least one expression. Here, the expression list may be either composed of a plurality of icons (or emoticons) representing expressions or may be composed of a plurality of characters representing the expressions. For example, the expression list may be composed of characters such as '1. Laugh, 2. Cry, 3. Wink, 4. Frown'. Also, the call video generator 102 may generate the avatar corresponding to the expression in a form of a dynamically altering animation. For example, an avatar corresponding to a winking expression may be generated to perform a motion of closing and opening eyes, and an avatar corresponding to a crying expression may be generated to perform a motion of wiping its eyes.

The communication module 110 processes a Radio Frequency (RF) signal transmitted/received through an antenna and, under control of the controller 100, transmits an alternative video including an avatar representing a user's expression to a called mobile communication terminal performing a video call.

The camera unit 120 converts image data of a recorded video into digital data, acquires a still video from the digital data, and outputs the still video to the controller 100 or the display unit 140.

The storage unit 130 stores a variety of programs and data for a general operation of the mobile communication terminal. More particularly, the storage unit 130 stores a plurality of icons (or emoticons) representing various expressions, and stores avatars of various motions corresponding to the icons. At this time, the avatar may be generated, changed, and stored by a user.

Under control of the controller 100, the display unit 140 may display any or all of state information generated during an operation of the mobile communication terminal, a character inputted by a user, a moving picture, a still picture, and the like, on a display screen. In addition, under control of the controller 100, the display unit 140 may display a video provided from the camera unit 120 or display an alternative video generated in the call video generator 102 of the controller 100, on a predefined region of the display screen.

The input unit 150 includes at least one of a function key, a numeral key, a character key, and a touch sensor, and provides data corresponding to a user's key input or touch operation to the controller 100.

FIG. 2 is a flowchart illustrating a procedure of, upon performing a video call, generating and transmitting an alternative video in a mobile communication terminal according to an exemplary embodiment of the present invention. Here, a description is made assuming that it is previously set that a user transmits an alternative video upon performing a video call.

Referring to FIG. 2, if the mobile communication terminal performs a video call with a called mobile communication terminal in step 201, the mobile communication terminal identifies a video generation mode representing a mode of generating an alternative video in step 203. Here, the video generation mode may be divided into a recognition mode for recognizing a user's expression and a selection mode for selecting the user's expression. Here, the video generation mode may be previously set before a video call, and may be changed in the course of the video call.

In a case where the video generation mode is identified as the recognition mode in step 203, the mobile communication terminal drives a camera unit and recognizes a user's face in a video inputted from the camera unit in step 205. In step 207, the mobile communication system then recognizes a user's expression in the recognized face. At this time, the user's face recognition and expression recognition may use various video recognition algorithms of the conventional art.

Thereafter, the mobile communication terminal generates an avatar representing the recognized expression in step 209 and then transmits the generated avatar to a called terminal in step 211. By previously storing a plurality of icons representing various expressions in a storage unit 130, searching the plurality of icons for an icon corresponding to the recognized expression, and combining the searched icon with an avatar, the mobile communication terminal may generate the avatar representing the recognized expression. Alternatively, the mobile communication terminal may previously store a plurality of avatars representing various expressions and search the plurality of avatars for the avatar corresponding to the recognized expression. At this time, the avatar may be generated in a form of a dynamically altering animation.

On the other hand, in a case where the video generation mode is identified as the selection mode in step 203, the mobile communication terminal displays a list of expressions in step 215. The mobile communication terminal then selects at least one of a plurality of expressions included in the expression list in accordance with a user's key input or touch operation in step 217. Here, the expression list may be either composed of a plurality of icons representing expressions or may be composed of a plurality of characters representing the expressions. For example, the expression list may be composed of characters such as '1. Laugh, 2. Cry, 3. Wink, 4. Frown'.

Thereafter, the mobile communication terminal generates an avatar representing the selected expression in step 209 and then, proceeds to subsequent step 211. At this time, the mobile communication terminal may either generate the avatar representing the selected expression by combining an icon corresponding to the selected expression with a preset avatar, or may search a plurality of avatars representing various expressions for the avatar representing the selected expression. At this time, the avatar may be generated in a form of a dynamically altering animation.

In step 211, the mobile communication terminal transmits an alternative video including the generated avatar to the called mobile communication terminal performing the video call. The mobile communication terminal then determines if the video call ends in step 213. If it is determined in step 213 that the video call does not end, the mobile communication terminal returns to step 203. In contrast, if it is determined in step 213 that the video call ends, the mobile communication terminal terminates the procedure according to the exemplary embodiment of the present invention.

Exemplary embodiments of the present invention have an effect of being capable of delivering a user's expression to a called party while protecting user's own privacy by, upon performing a video call, recognizing a user's expression through a camera unit, generating an alternative video representing the user's expression according to user selection, and transmitting the alternative video to a called mobile communication terminal in a mobile communication terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a video call in a mobile communication terminal, the method comprising:
   entering an alternative video transmission mode according to a user's manipulation during the video call;
   displaying a list of a plurality of expressions;
   determining at least one expression in the list;
   generating an avatar corresponding to the determined expression; and
   transmitting an alternative video including the avatar to a called mobile communication terminal.

2. The method of claim 1, wherein the list of expressions comprises an icon representing an expression or a character representing the expression.

3. The method of claim 1, wherein the avatar is generated in a form of a dynamically altering animation.

4. An apparatus for performing a video call in a mobile communication terminal, the apparatus comprising:
   a controller for controlling to enter an alternative video transmission mode during the video call, display a list of a plurality of expressions, determine at least one expression in the list, and generate an avatar corresponding to the determined expression; and
   a communication module for transmitting an alternative video including the avatar to a called mobile communication terminal.

5. The apparatus of claim 4, further comprising:
   a display unit for displaying the list of a plurality of expressions; and
   an input unit for receiving a selection of at least one expression in the list.

6. The apparatus of claim 4, wherein the list of expressions comprises an icon representing an expression or a character representing the expression.

7. The apparatus of claim 4, wherein the controller generates the avatar in a form of a dynamically altering animation.

* * * * *